(12) United States Patent
Tanigawa et al.

(10) Patent No.: US 9,078,304 B2
(45) Date of Patent: Jul. 7, 2015

(54) LIGHTING SYSTEM

(71) Applicant: Panasonic Corporation, Osaka (JP)

(72) Inventors: Tetsuya Tanigawa, Hyogo (JP); Yuichi Ejiri, Osaka (JP); Toshikazu Kawashima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 253 days.

(21) Appl. No.: 13/899,737

(22) Filed: May 22, 2013

(65) Prior Publication Data

US 2013/0334983 A1 Dec. 19, 2013

(30) Foreign Application Priority Data

Jun. 14, 2012 (JP) ................... 2012-135096

(51) Int. Cl.
*H05B 37/02* (2006.01)
*H04L 29/12* (2006.01)

(52) U.S. Cl.
CPC ............ *H05B 37/02* (2013.01); *H05B 37/0254* (2013.01); *H04L 61/2038* (2013.01); *H04L 61/2046* (2013.01)

(58) Field of Classification Search
CPC .............................. H05B 37/02; H05B 37/029
USPC ........................ 315/193, 194, 291, 294, 297
See application file for complete search history.

(56) References Cited

U.S. PATENT DOCUMENTS 8,405,323 B2 * 3/2013 Finney et al. ................. 315/312

FOREIGN PATENT DOCUMENTS

| JP | 2002-289373 A | 10/2002 |
| JP | 2004-063228 A | 2/2004 |
| JP | 2006-093098 A | 4/2006 |
| JP | 2009-206048 A | 9/2009 |
| JP | 2010-041132 A | 2/2010 |

* cited by examiner

*Primary Examiner* — Hai L Nguyen
(74) *Attorney, Agent, or Firm* — Renner, Otto, Boisselle & Sklar, LLP

(57) ABSTRACT

The lighting system includes a plurality of lighting apparatuses and a controller configured to control the lighting apparatuses. Upon receiving a random number generation instruction from the controller, the lighting apparatus generates a first random number and a second random number by using a random number generation unit, and counts synchronization signals sent from the controller. When acknowledging that the counted number of the synchronization signals is equal to the first random number, the lighting apparatus sends the second random number to the controller. The controller identifies the lighting apparatuses based on the second random numbers respectively received from the lighting apparatuses, and uniquely allocates mutually different addresses to the respective identified lighting apparatuses.

4 Claims, 3 Drawing Sheets ns to the respective lighting apparatus-->
LIGHTING SYSTEM

TECHNICAL FIELD

The present invention relates to lighting systems.

BACKGROUND ART

To date, lighting systems have been supplied in which a plurality of lighting apparatuses and a master for controlling the lighting apparatuses are connected via a communication line (see, for example, Japanese Laid-Open Patent Publication No. 2002-289373, hereinafter, referred to as Patent Literature 1). In the lighting system, ID numbers are uniquely assigned to the lighting apparatuses, respectively, in order to identify the lighting apparatuses, and only when, in each lighting apparatus, an ID number that is included in a communication signal transmitted from the master is identical to the ID number assigned to the same lighting apparatus, the lighting apparatus receives a control signal included in the communication signal, and operates according to the control signal.

In the lighting system, the ID numbers are assigned in the following method. When all the lighting apparatuses and the master have been installed and then powered on, the lighting apparatuses firstly generate respective random numbers and send the respective random numbers to the master, and the master issues provisional ID numbers to the respective lighting apparatuses according to the order of the random numbers, to assign the ID numbers to the respective lighting apparatuses.

Further, another method for allocating addresses with the use of random numbers is also disclosed. In this method, when a random number transmission instruction is transmitted from the master to each of the lighting apparatuses, each of the lighting apparatuses generates a random number, and sets its own timer so as to count to a time obtained by multiplying the generated random number by 10 ms, and transmits, to the master, a pulse signal at a time when the counting has been ended. On the other hand, the master measures, by using its own timer, a time period from a time when the random number transmission instruction is transmitted to each of the lighting apparatuses to a time when the pulse signal is received, and obtains the random number of each of the lighting apparatuses based on the measured value, to allocate addresses based on the obtained random numbers.

In the lighting system disclosed in Patent Literature 1, although the ID numbers can be automatically assigned with ease by using the random numbers, a problem may arise that, since the lighting apparatuses individually generate the random numbers, respectively, if the same random number is generated, by coincidence, among some of the lighting apparatuses, the lighting apparatuses cannot be identified.

Further, in a case where addresses are allocated to the respective lighting apparatuses in the latter method, when the timer of each of the lighting apparatuses and the master is formed as a typical ceramic oscillator, each of the timers has a maximum deviation of 0.5%, and thus, an error may occur between a random number obtained by measuring the time in the master, and a random number generated by each of the lighting apparatuses.

SUMMARY OF INVENTION

The present invention is made to solve the aforementioned problem, and an object of the present invention is to propose a lighting system capable of successfully allocating mutually different addresses to individual lighting apparatuses.

The lighting system in accordance with the present invention includes: a plurality of lighting apparatuses; and a controller configured to control the plurality of lighting apparatuses. Each of the lighting apparatuses includes: a random number generation unit configured to generate a random number; a first communication unit configured to communicate with the controller; a light source; and a lighting control unit configured to light the light source. The controller includes: an address setting unit configured to allocate addresses to the respective lighting apparatuses; and a second communication unit configured to communicate with each of the lighting apparatuses. Each of the lighting apparatuses is configured to generate, upon receiving a random number generation instruction from the controller, a first random number and a second random number by using the random number generation unit, count synchronization signals transmitted from the controller, and send, upon acknowledging that a counted number of the synchronization signals is equal to the first random number, the second random number to the controller. The controller is configured to identify the lighting apparatuses based on the second random numbers respectively received from the lighting apparatuses, and allocate uniquely the mutually different addresses to the respective identified lighting apparatuses.

In the lighting system, the controller is preferably configured to allocate, in the order of receiving the second random number, the addresses defined as serial numbers, to the respective lighting apparatuses.

Further, preferably, in the lighting system, the controller is configured to transmit a confirmation signal including the second random number and the first random number calculated based on the number of the synchronization signals at the time of receiving the second random number, to each of the lighting apparatuses, before allocation of the addresses is performed by the address setting unit, and each of the lighting apparatuses is configured to, upon acknowledging that the first random number included in the confirmation signal is identical to the first random number generated by the random number generation unit and the second random number included in the confirmation signal is identical to the second random number generated by the random number generation unit, transmit an authentication signal to the controller, and the controller is configured to, upon receiving the authentication signal, allocate the address to the lighting apparatus which has transmitted the authentication signal.

DESCRIPTION OF EMBODIMENTS

Hereinafter, a lighting system according to one embodiment will be described with reference to FIG. 1 to FIG. 3.

Figure 1:
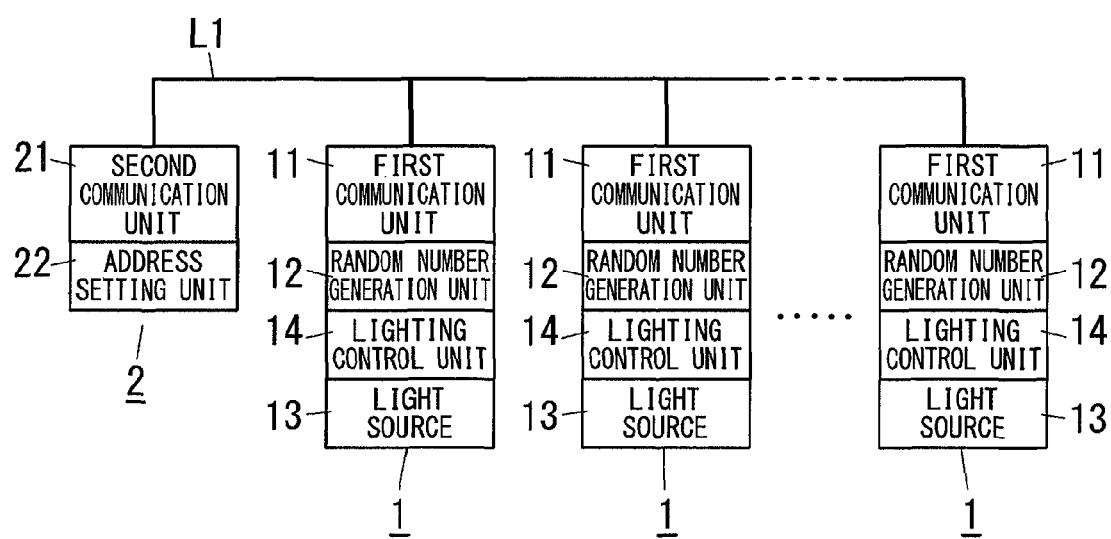
FIG. 1 is a schematic diagram illustrating an exemplary configuration of a lighting system according to one embodiment of the present invention.

FIG. 1 is a schematic diagram illustrating an exemplary configuration of the lighting system according to the present embodiment. The lighting system includes a plurality of lighting apparatuses 1, and a controller 2 configured to control the plurality of lighting apparatuses 1. Each of the lighting apparatuses 1 and the controller 2 are connected to each other via a two-wire communication line L1.

Each of the lighting apparatuses 1 includes: a random number generation unit 12 configured to generate a random number; a first communication unit 11 configured to communicate with the controller 2; a light source 13; and a lighting control unit 14 configured to light the light source 13.

The light source 13 is, for example, a straight tube fluorescent lamp. The lighting control unit 14 is an electric ballast employing a high-frequency lighting circuit designed to light the fluorescent lamp.

The random number generation unit 12 is realized by using, for example, a microcomputer, and generates a random number by repeating A/D conversion of an open port of the microcomputer. In other words, to generate a random number, an A/D converter of the microcomputer is controlled to perform A/D conversion while an input port of the A/D converter is left unconnected. In the present embodiment, the random number generation unit 12 generates a first random number and a second random number in response to a random number generation instruction transmitted from the controller 2. A method for generating random numbers is not limited to the method described above. For example, unique random numbers may be preliminarily stored in a memory in a factory. In this case, the random numbers may be retrieved from the memory in response to the random number generation instruction transmitted from the controller 2.

The first communication unit 11 performs wired-communication with a second communication unit 21 (described below) of the controller 2 via the communication line L1, and thus receives the random number generation instruction, synchronization signals, and the like transmitted from the controller 2, and sends the second random number to the controller 2 at a predetermined time.

The controller 2 includes an address setting unit 22 configured to allocate addresses to the respective lighting apparatuses 1, and the second communication unit 21 configured to communicate with each of the lighting apparatuses 1.

The address setting unit 22 is realized by using, for example, a microcomputer. The address setting unit 22 is configured to allocate, in the order of receiving the second random numbers sent from the respective lighting apparatuses 1, addresses defined as serial numbers (for example, 0, 1, 2, . . . ) to the respective lighting apparatuses 1.

The second communication unit 21 performs wired-communication with the first communication unit 11 of each of the lighting apparatuses 1 via the communication line L1, and thus transmits the random number generation instruction, synchronization signals, and the like to each of the lighting apparatuses 1, and receives the second random number sent from each of the lighting apparatuses 1.

Figure 2:
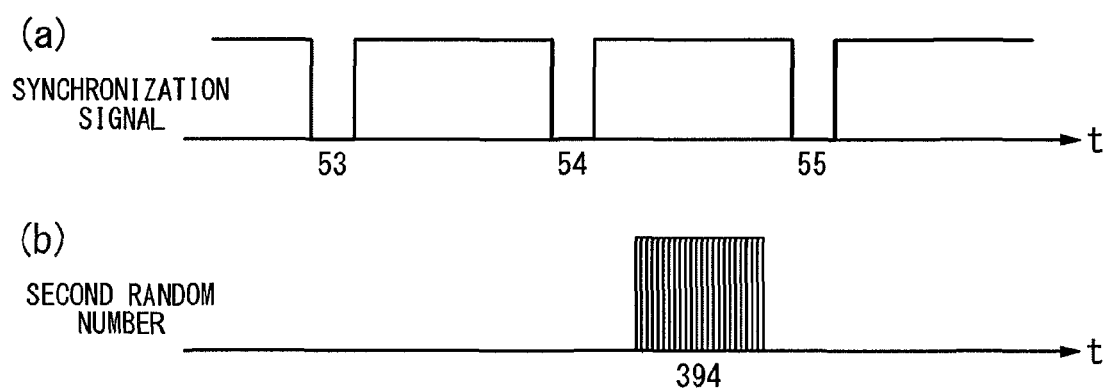
FIG. 2 shows waveform charts of signals relating to an operation of the above lighting system.
Figure 3:
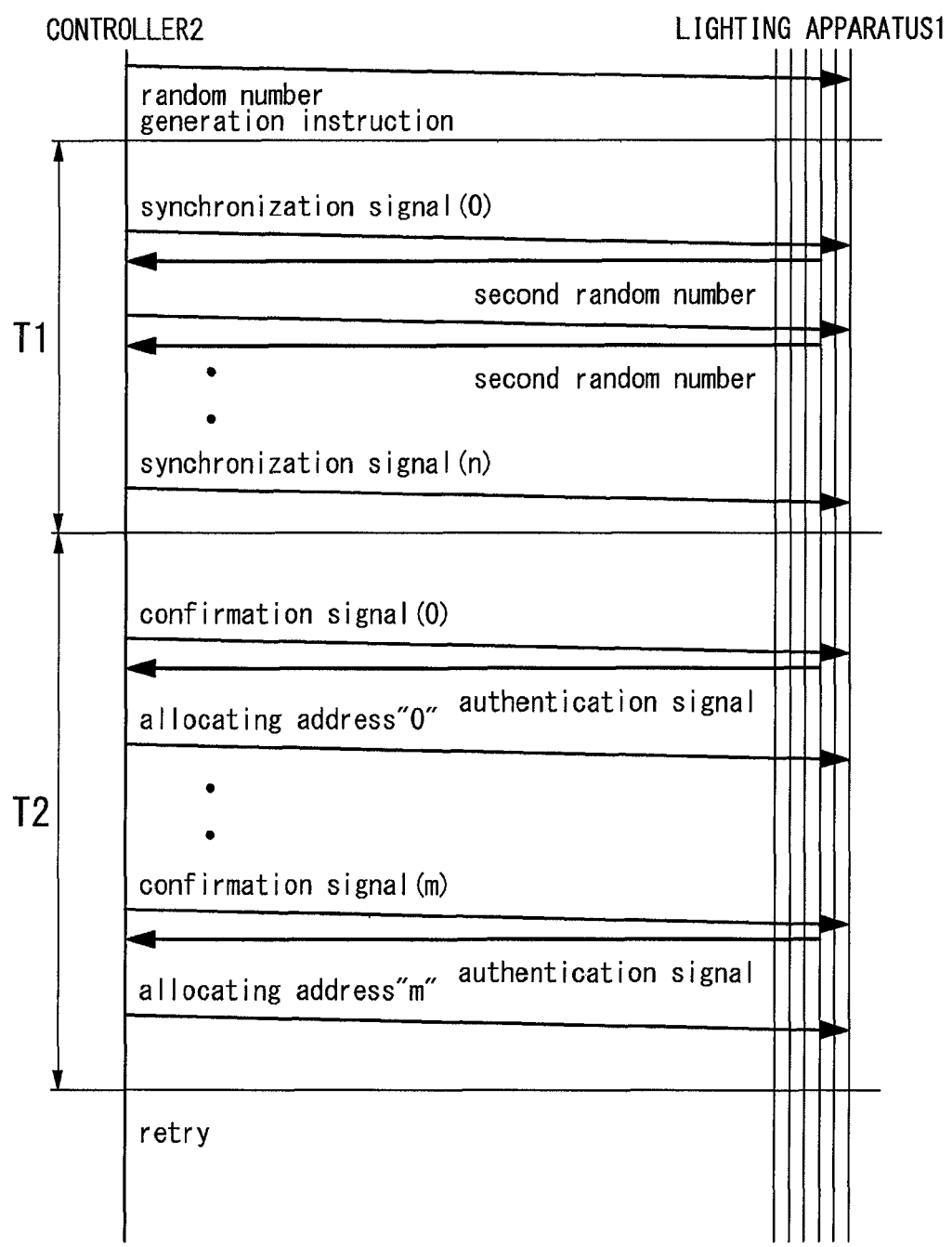
FIG. 3 shows a timing chart illustrating the operation of the above lighting system.

FIG. 2(*a*) shows a waveform of the synchronization signal transmitted from the controller 2. The controller 2 transmits, as the synchronization signal, a pulse signal having a rectangular waveform. The number of the synchronization signals transmitted by the controller 2 is equal to a value obtained by adding one to a maximum value of the first random number that may be generated by the random number generation unit 12 of each of the lighting apparatuses 1. For example, when the first random number in a range from 0 to 1023 is generated, the total number of the synchronization signals transmitted by the controller 2 is 1024.

Next, an operation of allocating addresses to the respective lighting apparatuses 1 in the lighting system of the present embodiment will be described with reference to FIG. 2 and FIG. 3. When all the lighting apparatuses 1 and the controller 2 are powered on in a situation where an address is allocated to none of the lighting apparatuses 1, an operation of allocating addresses to the respective lighting apparatuses 1 is started. The controller 2 transmits the random number generation instruction to each of the lighting apparatuses 1, and thereafter transmits the synchronization signals at regular intervals (in a period T1 in FIG. 3). Upon receiving the random number generation instruction from the controller 2, each of the lighting apparatuses 1 generates the first random number and the second random number by using the random number generation unit 12. Further, each lighting apparatus 1 counts the synchronization signals transmitted from the controller 2. Upon acknowledging that the counted number of the synchronization signals is equal to the first random number, the lighting apparatus 1 transmits, to the controller 2, the same number of pulse signals as the second random number. For example, in a case where, as shown in FIG. 2, the first random number generated by the random number generation unit 12 of one of the lighting apparatuses 1 is 54 and the second random number generated by the same lighting apparatus 1 is 394. When the counted number of the synchronization signals is identical to 54 which is the same number as the first random number, the same lighting apparatus 1 transmits, to the controller 2, the same number of the pulse signals as the second random number, that is, 394 pulse signals. As shown in FIG. 2, the pulse signals are transmitted to the controller 2 before the subsequent synchronization signal (the fifty-fifth synchronization signal) is transmitted. In the same manner, the controller 2 receives the second random numbers from all the lighting apparatuses 1 at times based on the first random numbers, respectively. When completing the transmission of the synchronization signals, the controller 2 starts an operation of allocating an address to the lighting apparatus 1 which has sent the second random number.

Before the controller 2 allocates addresses to the respective lighting apparatuses 1 by using the address setting unit 22, the controller 2 checks whether or not the lighting apparatus 1 identified by the received second random number exists. Specifically, the controller 2 transmits, to all the lighting apparatuses 1, a confirmation signal including the second random number and the first random number calculated based on the number of the synchronization signal at the time of receiving the second random number, for each of the received second random numbers. When acknowledging that the first random number included in the confirmation signal received from the controller 2 is identical to the first random number thereof, and that the second random number included in the confirmation signal is identical to the second random number thereof, the lighting apparatus 1 transmits an authentication signal to the controller 2. The controller 2 allocates an address to the lighting apparatus 1 which has transmitted the authentication signal (in a period T2 in FIG. 3). In the same manner, addresses are allocated to all the lighting apparatuses 1, respectively. In a case where the confirmation operation is performed as described above, even if the some of the lighting apparatuses 1 have the same first random number, the lighting apparatus does not send the authentication signal unless the lighting apparatus has the same second random number as included in the confirmation signal. Therefore, it is possible to avoid duplication of the addresses.

Further, when the two lighting apparatus 1 have the same first random number but have the different second random numbers, the two lighting apparatuses send the same number of pulse signals as the second random number at the same timing since the first random numbers thereof coincide with each other. Although the two lighting apparatuses 1 have the different second random numbers, the two lighting apparatuses 1 simultaneously send their second random numbers to the controller 2. As a result, the controller 2 may receive broken signals, or may receive only the second random number of either one of the two lighting apparatuses 1. Therefore, in a process of checking the presence of the lighting apparatus 1 identified by the received second random number, the authentication signals are not transmitted from the two lighting apparatuses 1, and thus the allocation of the same address to the two lighting apparatuses 1 can be prevented.

When the controller 2 allocates, by using the address setting unit 22, addresses to the lighting apparatuses 1 which have transmitted the authentication signals, the addresses which start from 0 and is increased one by one are sequentially allocated to the lighting apparatuses 1 in the order of receiving the second random numbers, that is, in the order of the first random numbers. Consequently, with selecting the address from numerical values less than the second random number, the number of bits representing the address can be reduced and thus communications traffic can be reduced.

Further, with performing again the above operation with regard to the lighting apparatuses 1 to which addresses have not been allocated due to coincidence in random number or communication error, addresses can be allocated to these lighting apparatuses 1.

Thus, according to the present embodiment, each lighting apparatus 1 generates the first random number and the second random number by using the random number generation unit 12, and, upon acknowledging that the number of the synchronization signals transmitted from the controller 2 becomes equal to the first random number, sends the second random number to the controller 2. Therefore, even when a timer of each of the lighting apparatuses 1 and the controller 2 has a deviation, a value corresponding to a timing at which the controller 2 receives the second random number can be used as the first random number. Further, even when coincidence in the first random number occurs, the lighting apparatuses 1 can be identified by their respective second random numbers. Therefore, mutually different addresses can be assuredly allocated uniquely to the respective lighting apparatuses 1. Further, only when acknowledging that the first random number and the second random number which are included in the confirmation signal transmitted from the controller 2 are respectively identical to the first random number and the second random number which are generated by the random number generation unit 12 thereof, each of the lighting apparatuses 1 transmits the authentication signal to the controller 2. Therefore, the controller 2 is allowed to confirm, based on the authentication signal, whether or not coincidence in random number occurs. Consequently coincidence in address can be avoided.

Although, in the present embodiment, the synchronization signal transmitted from the controller 2 is defined as the pulse signal having the rectangular waveform, the synchronization signal is not limited to the signal described herein. For example, values counted in the controller 2 so as to be sequentially incremented may be transmitted as the synchronization signals. Further, in the present embodiment, before allocating addresses to the respective lighting apparatuses 1, the controller 2 checks the presence of the lighting apparatuses 1 respectively corresponding to the received second random numbers. However, addresses may be allocated without performing such a checking operation. In this case, a time period necessary for allocating the addresses can be shortened.

The invention claimed is:

1. A lighting system comprising:
a plurality of lighting apparatuses; and
a controller configured to control the plurality of lighting apparatuses,
wherein
each of the lighting apparatuses includes:
a random number generation unit configured to generate a random number;
a first communication unit configured to communicate with the controller;
a light source; and
a lighting control unit configured to light the light source, and
the controller includes:
an address setting unit configured to allocate addresses to the respective lighting apparatuses; and
a second communication unit configured to communicate with each of the lighting apparatuses, and
each of the lighting apparatuses is configured to
upon receiving a random number generation instruction from the controller, generate a first random number and a second random number by using the random number generation unit, and
count synchronization signals transmitted from the controller, and
upon acknowledging that a counted number of the synchronization signals is equal to the first random number, send the second random number to the controller, and
the controller is configured to
identify the lighting apparatuses based on the second random numbers respectively received from the lighting apparatuses, and
allocate uniquely the mutually different addresses to the respective identified lighting apparatuses.

2. The lighting system as set forth in claim 1, wherein the controller is configured to allocate, in order of receiving the second random number, the addresses defined as serial numbers, to the respective lighting apparatuses.

3. The lighting system as set forth in claim 2, wherein the controller is configured to transmit a confirmation signal including the second random number and the first random number calculated based on a number of the synchronization signals at time of receiving the second random number, to each of the lighting apparatuses, before allocation of the addresses is performed by the address setting unit, and
each of the lighting apparatuses is configured to, upon acknowledging that the first random number included in the confirmation signal is identical to the first random number generated by the random number generation unit and the second random number included in the confirmation signal is identical to the second random number generated by the random number generation unit, transmit an authentication signal to the controller, and
the controller is configured to, upon receiving the authentication signal, allocate the address to the lighting apparatus which has transmitted the authentication signal.

4. The lighting system as set forth in claim 1, wherein the controller is configured to transmit a confirmation signal including the second random number and the first random number calculated based on a number of the synchronization signals at the time of receiving the second random number, to each of the lighting apparatuses, before allocation of the addresses is performed by the address setting unit, and
each of the lighting apparatuses is configured to, upon acknowledging that the first random number included in the confirmation signal is identical to the first random number generated by the random number generation unit and the second random number included in the confirmation signal is identical to the second random number generated by the random number generation unit, transmit an authentication signal to the controller, and the controller is configured to, upon receiving the authentication signal, allocate the address to the lighting apparatus which has transmitted the authentication signal.

* * * * *